United States Patent
Zhang et al.

(10) Patent No.: US 9,346,384 B2
(45) Date of Patent: May 24, 2016

(54) HEATING FAN, IN PARTICULAR FOR USE AS A NECK WARMER IN VEHICLE SEATS

(71) Applicant: GENTHERM AUTOMOTIVE SYSTEMS (CHINA) LTD., Langfeng Hebei Prov. (CN)

(72) Inventors: Jonathan (Yu) Zhang, Tianjin (CN); Steve (Fubing) Peng, Langfang (CN); Amy (Yakun) Yuan, Langfang (CN); Ted (Chunlong) Shi, Langfang (CN)

(73) Assignee: Gentherm Automotive Systems (China) Ltd., Langfang Hebei Prov. (CN)

( * ) Notice: Subject to any disclaimer, the term of this patent is extended or adjusted under 35 U.S.C. 154(b) by 0 days.

(21) Appl. No.: 14/574,599

(22) Filed: Dec. 18, 2014

(65) Prior Publication Data

US 2015/0183348 A1 Jul. 2, 2015

(30) Foreign Application Priority Data

Dec. 26, 2013 (CN) .......................... 2013 1 0730649

(51) Int. Cl.
*B60N 2/56* (2006.01)
*B60N 2/48* (2006.01)
*F24H 3/04* (2006.01)

(52) U.S. Cl.
CPC ............... *B60N 2/5657* (2013.01); *B60N 2/56* (2013.01); *B60N 2/4876* (2013.01); *B60N 2/5671* (2013.01); *F24H 3/0429* (2013.01)

(58) Field of Classification Search
CPC ................................ B60N 2/4876; B60N 2/56
USPC .............................. 297/180.1, 180.13, 180.14
See application file for complete search history.

(56) References Cited

U.S. PATENT DOCUMENTS

| | | | |
|---|---|---|---|
| 2,738,593 A * | 3/1956 | Fox ........................ | A45D 20/22 297/180.14 |
| 3,101,660 A | 8/1963 | Taylor | |
| 5,102,189 A * | 4/1992 | Saito ..................... | B60N 2/5635 261/DIG. 88 |
| 5,160,517 A | 11/1992 | Hicks et al. | |
| 5,839,774 A | 11/1998 | Hack et al. | |
| 5,921,100 A * | 7/1999 | Yoshinori .......... | B60H 1/00285 165/43 |
| 5,927,817 A | 7/1999 | Ekman et al. | |
| 6,059,018 A | 5/2000 | Yoshinori et al. | |
| 6,179,706 B1 * | 1/2001 | Yoshinori ............ | B60N 2/5635 297/180.14 |
| 6,196,627 B1 | 3/2001 | Faust et al. | |
| 6,321,996 B1 | 11/2001 | Odebrecht et al. | |
| 6,604,785 B2 | 8/2003 | Bargheer et al. | |
| 6,644,735 B2 | 11/2003 | Bargheer et al. | |
| 6,746,076 B2 * | 6/2004 | Bogisch ................... | B60J 7/223 297/180.14 |
| 6,761,399 B2 | 7/2004 | Bargheer et al. | |
| 7,784,863 B2 * | 8/2010 | Fallen .................. | B60N 2/4808 297/180.1 |
| 7,963,595 B2 * | 6/2011 | Ito ........................ | B60N 2/5657 297/180.1 |

(Continued)

FOREIGN PATENT DOCUMENTS

| | | | | |
|---|---|---|---|---|
| DE | 19949935 C1 * | 11/2000 | ......... | B60H 1/00285 |
| DE | 10047754 A1 * | 4/2002 | ............... | B60J 7/223 |

(Continued)

*Primary Examiner* — Rodney Mintz
(74) *Attorney, Agent, or Firm* — The Dobrusin Law Firm, P.C.

(57) ABSTRACT

The present teachings relate to a ventilating apparatus for a body supporting means, comprising: at least one air conveying means, at least one air guiding means, and at least one outlet opening in an area of the body supporting means, which is associated with the neck of a user.

17 Claims, 5 Drawing Sheets

(56) References Cited

U.S. PATENT DOCUMENTS

| | | | |
|---|---|---|---|
| 8,167,368 B2 | 5/2012 | Eckel | |
| 8,201,203 B2 * | 6/2012 | Vitito | B60N 2/4876 297/180.14 |
| 2008/0036249 A1 * | 2/2008 | Heckmann | B60H 1/00407 297/180.13 |
| 2009/0134677 A1 * | 5/2009 | Maly | B60N 2/5657 297/180.14 |
| 2011/0101741 A1 * | 5/2011 | Kolich | B60N 2/4876 297/180.12 |
| 2011/0115263 A1 * | 5/2011 | Bargheer | B60H 1/00407 297/180.13 |
| 2013/0043320 A1 * | 2/2013 | Zhang | B60N 2/5621 237/28 |
| 2013/0300179 A1 * | 11/2013 | Ota | B60N 2/5664 297/452.42 |
| 2014/0152057 A1 * | 6/2014 | Truant | B60N 2/4876 297/180.12 |
| 2014/0159442 A1 | 6/2014 | Helmenstein | |

FOREIGN PATENT DOCUMENTS

| | | | | |
|---|---|---|---|---|
| DE | EP 1075984 B1 * | 5/2003 | | B60N 2/5635 |
| IT | EP 0217752 A2 * | 4/1987 | | B60H 1/00471 |
| JP | DE 19824191 A1 * | 12/1998 | | B60H 1/00285 |
| JP | DE 19830797 A1 * | 1/1999 | | B60H 1/00285 |
| JP | DE 19927232 A1 * | 12/1999 | | B60N 2/5635 |
| JP | 2013184588 A * | 9/2013 | | |

* cited by examiner

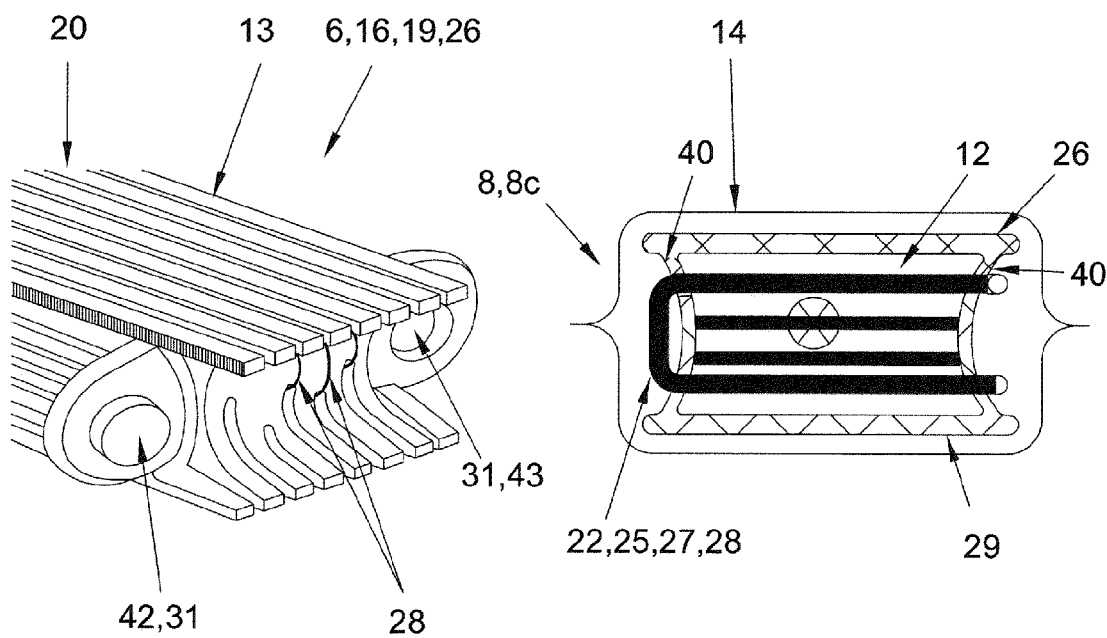

HEATING FAN, IN PARTICULAR FOR USE AS A NECK WARMER IN VEHICLE SEATS

FIELD

The present invention relates to a ventilating apparatus including a ventilating apparatus for a body supporting means comprising: at least one air conveying means, at least one air guiding means, and at least one outlet opening in an area of the body supporting means, which is associated with a neck of a user. The ventilating apparatus is used, for example, as a neck warmer for air conditioning of vehicle seats and vehicle cabins.

BACKGROUND

Prior-art neck warmers are limited in their functionality, or relatively expensive. There is therefore a need for cheap systems with high efficiency, ease of installation and a compact, weight-saving design.

SUMMARY

In view of the above a technical concept is suggested having the features including a ventilating apparatus for a body supporting means comprising: at least one air conveying means, at least one air guiding means, and at least one outlet opening in an area of the body supporting means, which is associated with a neck of a user. Further advantageous embodiments can be derived from the further claims and the following description.

BRIEF DESCRIPTION OF THE DRAWINGS

Details of the invention will be explained in the following. These explanations are for the further illustration of the invention. However, they are only of exemplary character. Of course, individual or several of the features described may also be omitted, modified or supplemented within the scope of the invention as defined by the claims. The features of different embodiments may, of course, also be combined with each other. If a feature is to be at least partially fulfilled, this also includes that the relevant feature is completely or essentially completely fulfilled. What is crucial is that the implementation allows the desired use to be achieved to a recognizable extent, for example by a corresponding feature being fulfilled by at least 50%, 90%, 95% or 99%. If a minimum amount is indicated, more than the minimum amount can, of course, also be used. Features described for one object can also be applied to the greater part or the entirety of all other equivalent objects. If not otherwise indicated, intervals also include their end points.

In the following, reference will be made to the drawing figures, wherein:

FIG. 5 is a perspective view of a duct segment of an air guiding means; and

FIG. 6 is a cross-sectional view of a duct segment of FIG. 1.

DETAILED DESCRIPTION

The present application claims priority to Chinese patent application No. CN201310730649.4, filed on Dec. 26, 2013, the contents of which are expressly incorporated by reference herein in its entirety for all purposes.

Figure 1:
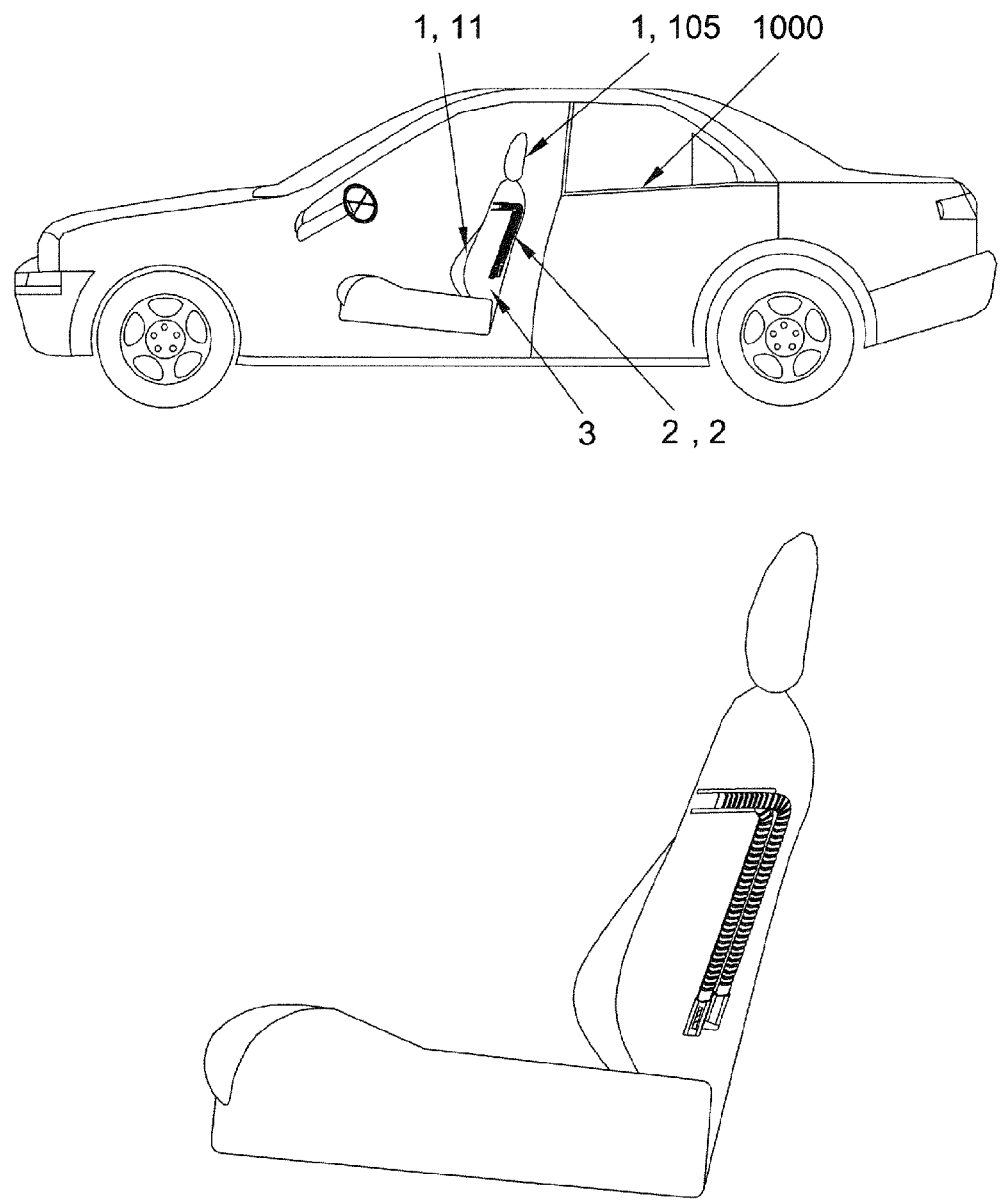
FIG. 1 is a partial longitudinal view of an automotive vehicle.

FIG. 1 shows a vehicle or craft 1000 as a conceivable field of use of the present invention. It can be, for example, an aircraft, a rail vehicle, a ship or, as in the present example, an automotive vehicle.

The vehicle comprises at least one body supporting means 1. If in doubt, this means all components which support a user of a passenger compartment, in particular, seats, benches, head rests, arm rests, or the like.

Such a body supporting means 1 has preferably at least one neck fan 2 associated with it in the form of a neck warmer 2'.

Preferably, at least one neck fan 2 comprises at least one ventilating apparatus 6. "Ventilating apparatus" means, in particular, a means which can be used for the selective modification of the air composition or the air flow in a particular surface or space area, for example an on-board air conditioning system, at least partially air-permeable spacing media, spacing non-wovens and/or air-conditioning inlays. This allows at least one neck area of a person to be ventilated.

Advantageously, at least one ventilating apparatus 6 comprises at least one air conveying means 7. The term "air conveying means" comprises, in particular, a means for moving air. Axial or radial fans are conceivable, for example.

The neck fan 2 comprises at least one or more air conveying means 7, to suck air from behind and/or below a body supporting means 1, and expel it toward the user. As in the present case, a radial fan 21 is particularly suitable.

Figure 2:
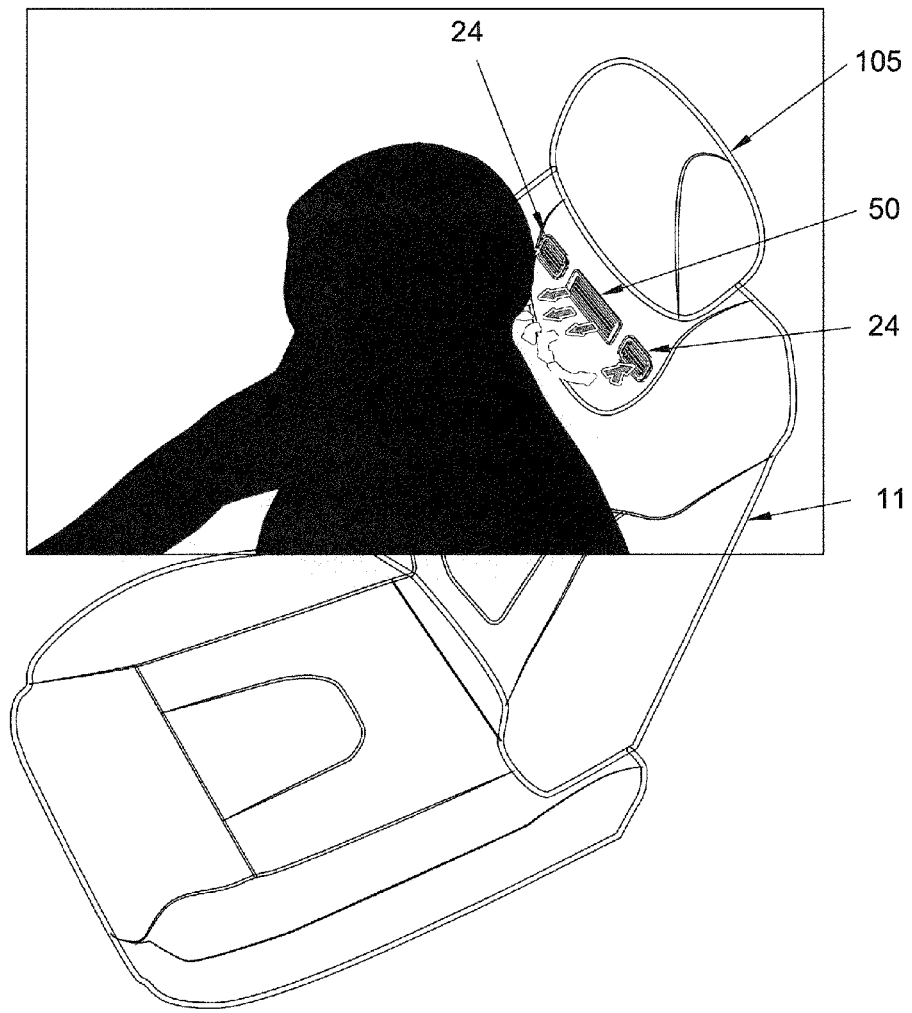
FIG. 2 shows the top part of a seat of the automotive vehicle of FIG. 1 with a neck warmer.
Figure 3:
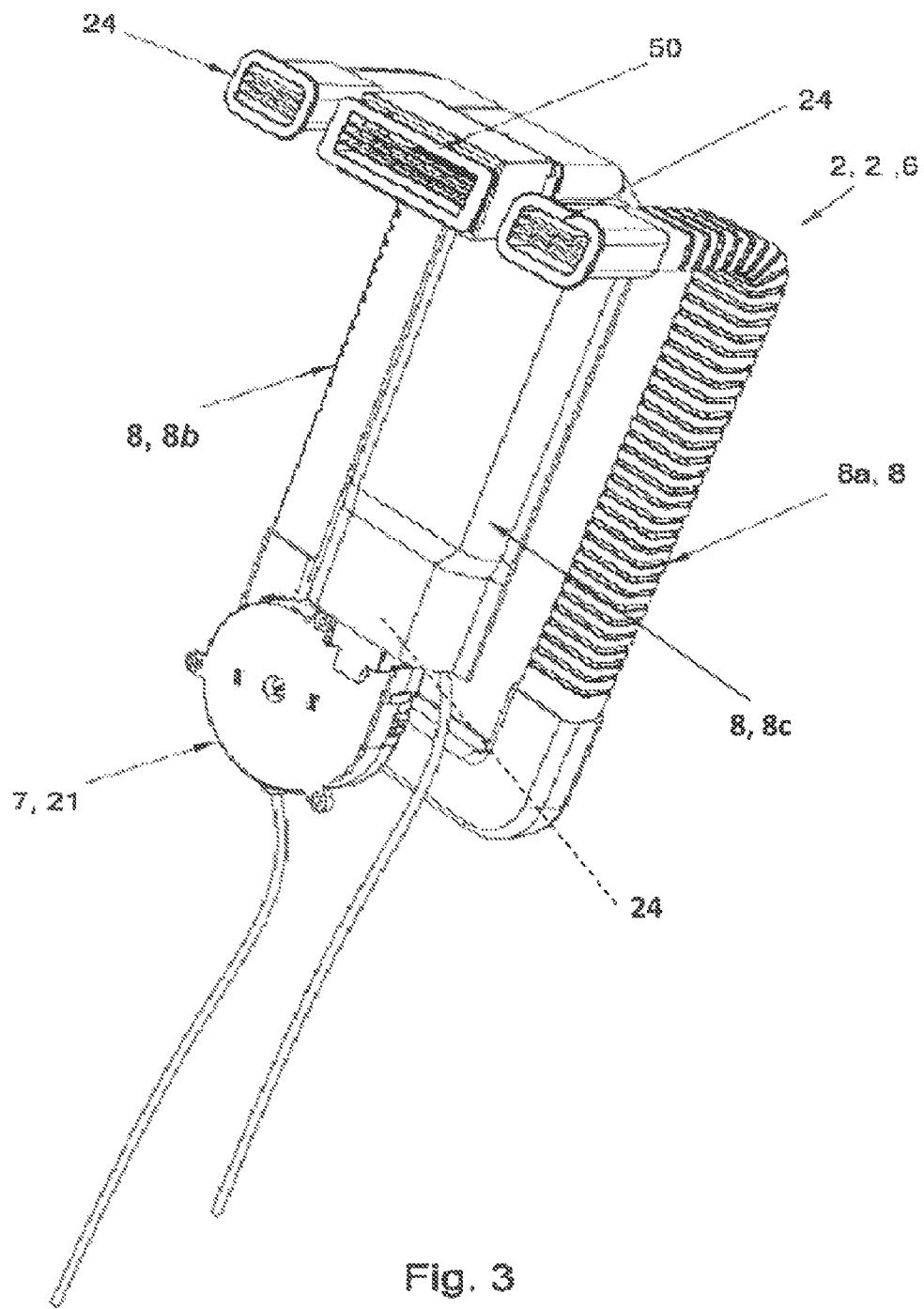
FIG. 3 is a perspective view of the neck warmer of FIG. 2.
Figure 4:
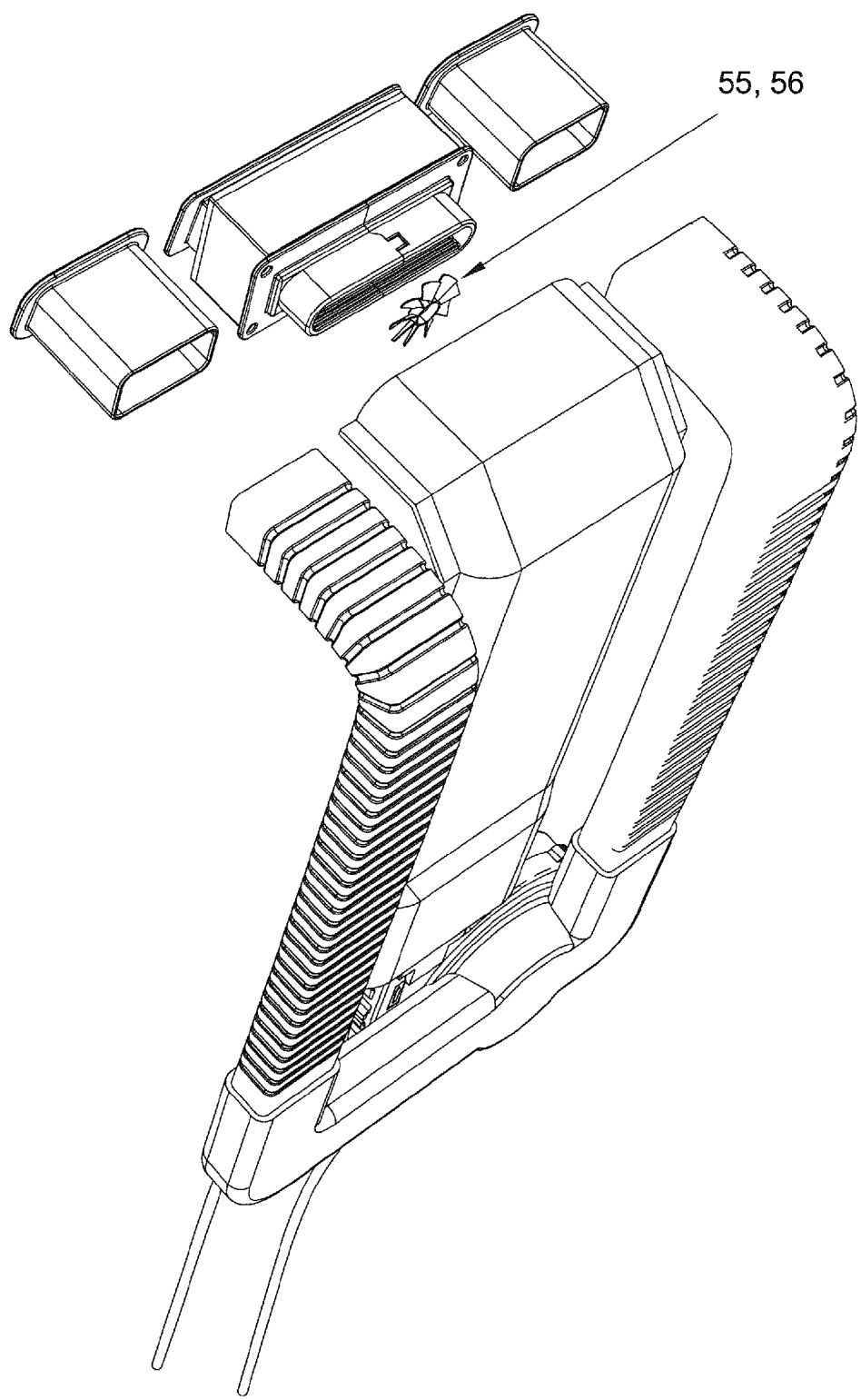
FIG. 4 shows the outlet port of the neck warmer of FIG. 3 with an impeller.

The air conveying means 7 can be arranged, as shown in FIG. 2, below a head rest 105 or a back rest 11. It can also be arranged on a B side of the cushion 3 facing away from the user, to achieve good vibration damping. Depending on the application, it can also be advantageous to integrate it into the cushion 3.

Suitably, at least one air guiding means comprises at least one spacing means 13. "Spacing means" means, in particular, a means which can stop or prevent compression of an air-guiding free space 12 of the air guiding means.

Preferably, at least one air guiding means 8 comprises at least one enveloping means 14. The term "enveloping means", in particular, refers to a means for preventing air from escaping from the air guiding means at an undesirable position.

It is recommended to provide at least one enveloping means 14, at least partially of a material which stops the permeation of air, in particular in areas facing away from the user. Air-impermeable sheets, a metal plate, a napped plastic sheet, a substantially air-impermeable foamed panel, stiff plastic sections are particularly suitable.

Advantageously, at least one enveloping means 14 at least partially envelops a spacing means 13, so that at least locally an envelope is formed essentially closed along the circumference of the cross-section. This allows an air flow to be efficiently guided through the air guiding means while at the same time allowing simple installation.

Preferably, at least one air guiding means 8 comprises at least one air guiding duct 16. "Air guiding duct" means, in particular, an oblong cavity for conveying air to or from the air exchanging means and/or to or from the air conveying means.

Suitably, at least one air guiding duct 16 at least partially has a position which protects its free flow cross-section against compression by the weight of a user's body and which allows the air distribution to be as free of loss and as efficient as possible. This is done, for example by means of foam integration in a cushion or by leaving a recess in the foam of a cushion.

Preferably, at least one air duct 16 at least partially has an orientation which results in distribution along a surface to be vented or ventilated. Conceivable is, for example, an at least partial extension on a B side of a cushion facing away from the user or on a lateral end face between A and B sides.

Preferably, at least one air guiding means 8 comprises at least one duct segment 19. "Duct segment" means, in particular, a definable component or a definable section of a component relatively moveable, in particular longitudinally and/or transversely displaceable, tiltable, hinged and/or bendable, with respect to other components or sections of components situated in front or behind it in the flow direction. Preferably, it is a component which is stiff or has little elasticity.

Suitably, at least two duct segments 19 are provided adjacent to each other and one behind the other in the flow direction, in order to support an elongate air guiding duct 16.

It can be useful to provide such a duct segment 19 in a number which results in an enlarged, safely supported flow cross-section. Examples are a plurality of duct segments or segment frames juxtaposed in the cross-sectional plane. This enables increased compression resistance due to a greater number of transverse webs 40 in the air-carrying cross-section.

Preferably, a duct segment 19 has a position which results in minimizing air losses to the outside, for example in the form of tube sections which are arranged one behind the other and enveloped by an enveloping means 14, or which surround an elongate enveloping means in a supporting manner from the outside (not shown).

It is recommended for at least one duct segment 19 to comprise at least one segment frame 20. "Segment frame", in particular, relates to a component which supports at least two sides of a cavity cross-section (transverse to the flow direction) with respect to each other. Tube sections having a round or rectangular cross-section are particularly suitable.

A material is recommended for this purpose, which is compression resistant and stiff. Suitable materials are, for example, plastic materials, in particular fiber-reinforced polymers.

Advantageously, at least one duet segment 19 comprises at least one segment joint 31. The term "segment joint" comprises, in particular, a means allowing hinge action or bending of a duct segment 19 relative to a duct section arranged in front of or behind the duct segment 19. This allows compression-resistant and flexible or bent ducts to be realized. Examples are nubs 42 or recesses 43 provided as centers of rotation on the duct segment 19 on its center axis and engaging corresponding nubs or recesses of another component. Hinge bands or sheet-like structures (for example an enveloping means) are conceivable, on which duct segments are attached and which connect a segment frame at at least one of its outer edges with another component (not shown).

Advantageously, at least one neck fan 2 comprises at least one temperature control device 22. "Temperature control device" means, in particular, a means which can be used for the selective change of the temperature in its surroundings. Heating devices, cooling means, a Peltier element, a heat pipe and/or an air conveying means, such as a fan, are particularly suitable. It can be particularly advantageous for the temperature control device 22 to be adapted for operation with direct current and/or operation with low voltage, in particular 12 V or 24 V. Inlay modules integrated in an interior decoration object, such as a seat, are conceivable.

Preferably, at least one temperature control device comprises at least one conductor strand. The term "conductor strand" means, in particular, an electrically conductive strand. "Strand" means, in particular, an object having an extension in one dimension which is substantially greater (for example, 10 times greater) than in its remaining dimensions in space. Preferably, the strand is flexible, strong, and has similar dimensions in the two cross-sectional dimensions. It can be a monofilament or a multi-filament.

It is recommendable for the temperature control device 22 to comprise at least one heating device 25. The term "heating device" refers to, in particular, a device which provides thermal energy for the selective heating of its environment and transfers it to its surroundings in a conductive and/or convective manner and/or by means of heat radiation. This allows rapidly effective or long-term warming of a user or the warming of an object to be heated, in particular of a housing interior. Apparatus with at least one electric resistive heater, a flexible textile flat heating element, a heat pump, a Peltier element, a radiator, a convector and/or a heating filament, are mentioned as examples.

Advantageously, at least one heating device 25 comprises at least one resistive heater support 26. "Resistive heater support" comprises, in particular, a device for mechanically load-relieving a resistive heater and/or for fixing its spatial position. Flexible sheet-like structures are particularly suitable, preferably at least partially consisting of a textile, non-woven, knitted fabric, woven fabric, fleece, flexible thermoplastics, stamped or nabbed sheets, air-permeable material, the controlled system itself, a part of its surface or stiffened components, sections, hollow bodies or segment frames 20 of an air conduction duct.

Suitably, at least one heating device 25 comprises at least one temperature control strand 28. The term "temperature control strand" includes, in particular, a strand-like component for the introduction or removal of heat along the strand, e.g. a resistive heater 27 or a heat pipe (as an alternative, not shown).

Advantageously, at least one temperature control strand 28 at least partially has a position which results in efficient temperature control of air flowing past. Examples are planes along a surface to be heated, windings around an air conduction duct or lines transverse to the extension direction of a fluid duct in the medium flowing past. It is particularly advantageous for the temperature control strand to pass within or around individual duct segments, in particular inserted in recesses of the duct. A preferred embodiment results by winding a temperature control strand 28 around a duct segment and inserting it in openings in the segment frame. By these means, the fluid flows around portions of the temperature control strand protruding into the flow, thus heating it. It may be recommendable to insert a plurality of sections of the temperature control strand on different planes of the fluid duct, in order to uniformly heat up even laminar flows.

The ventilating apparatus 6 and the body supporting means 1 have at least one outlet opening 50 in an area of the body supporting means 1 which is associated with the neck of a user. Air from the air conducting means 8 is blown through this outlet opening 50 toward the neck of the user. Preferably, this outlet opening 50 is provided centrally with respect to the longitudinal axis of the user's body and on the A side of the body supporting means 1 facing the user. One or more openings may be provided. Preferably, an elongate opening shape in a horizontal orientation is provided.

The ventilating apparatus 6 and the body supporting means 1 preferably include at least one intake opening 24 in an area of the body supporting means 1, which is associated with the neck of the user. Air is sucked from the neck of the user into the air guiding means 8 through this intake opening 24 by means of the air conveying means 7. Preferably, this intake opening 24 is provided to the side of the outlet opening 50.

Preferably, one intake opening 24 is provided on each side of the outlet opening 50 and on the A side of the body supporting means 1 facing the user. One or more openings can be provided. Preferred is an elongate opening shape in a horizontal orientation.

The air guiding means 8 preferably comprises at least one arm 8a, b, c. Advantageously, two arms 8a, 8b are provided, which connect the two intake openings 24 with the air conveying means 7. Preferably, a further arm 8c is arranged so that it connects the air conveying means 7 with the outlet opening 50. This creates a circular system in which air circulates between the surroundings of the neck and the air conveying means 7. If the air guiding means 8 is associated with the arm of the outlet opening 50 of at least one temperature control means 22, the circulating air is repeatedly passed across the temperature control means 22. By these means, the air can be particularly effectively brought to a desired setpoint temperature.

Preferably, the ventilating apparatus 6 is equipped with at least one mixing device 55. The latter mixes and swirls an air flow moved by the air conveying means 7 so that the air flow impinging on the users neck has a temperature distribution which is as homogeneous as possible. Such a mixing device preferably comprises one or more fins, grids or impellers 56. The latter can be, for example, electrically driven impellers, or fixed, immovable diffusors. However, it is particularly preferred for at least one impeller to be moveably supported and non-motorized. Its size, blade inclination, weight and material is chosen such that the impeller is moveable essentially or exclusively by means of the air flow. The resulting rotation of the blades serves to swirl the air flow and to make its air distribution homogeneous.

Preferably, at least one impeller 56 is at least partially of aluminum or a polymer. Its diameter is preferably chosen such that it is able to freely rotate within the free cross-section of the air guiding means. Preferably, it is at least 50% of the maximum possible diameter, more preferably at least 80%.

Preferably, the mixing device 55 is at least partially arranged within the air guiding means, preferably in its arm 8c associated with the outlet opening.

It is particularly preferred for the ventilating apparatus to include at least one outlet opening 50 on an A side of the body supporting means 1 facing a passenger present on the body supporting means 1, to have at least one intake opening 24 on the same A side, and for the openings 24, 50 to have a position relative to each other which in operation enables at least partial recirculation of expelled air into the intake opening 24.

LIST OF REFERENCE NUMERALS

1 body supporting means
2 neck fan
2' neck warmer
3 cushion
6 ventilating apparatus
7 air conveying means
8 air guiding means
8a, b, c arms of the air guiding means
8a first arm of the air guiding means
8b second arm of the air guiding means
8c third arm of the air guiding means
11 back rest
12 free space
13 spacing means
14 enveloping means
16 air conduction duct
19 duct segment
20 segment frame
21 radial fan
22 temperature control device
24 intake opening
25 heating device
26 resistive heater support
27 resistive heater
28 temperature cont
31 segment joint
40 transverse web
42 nub
43 recess
50 outlet opening
56 impeller
105 head rest
1000 vehicle

The invention claimed is:

1. A ventilating apparatus for a body supporting means comprising:
    at least one air conveying means,
    a first arm connected at one end to the at least one air conveying means, at an opposing end the first arm includes a first intake opening,
    a second arm connected at one end to the at least one air conveying means, at an opposing end the second arm includes a second intake opening,
    a third arm connected to the at least one air conveying means,
    an outlet opening connected to the third arm, the outlet opening is positioned in an area of the body supporting means associated with a neck of a user, and
    a mixing device comprising a non-motorized impeller arranged within the third arm, the mixing device mixes and swirls air moved by the at least one air conveying means so that the air has a homogeneous temperature distribution,
    wherein the at least one air conveying means sucks air through the first intake opening and the second intake opening, and
    wherein the at least one air conveying means blows air out of the outlet opening towards the neck of the user.

2. The ventilating apparatus according to claim 1, wherein the outlet opening is arranged on an A side of the body supporting means facing the user present on the body supporting means,
    wherein the outlet opening, the first intake opening, and the second intake opening have a position relative to each other so that in operation the position enables at least a partial recirculation of expelled air from the outlet opening into the first intake opening and the second intake opening.

3. The ventilating apparatus according to claim 1, wherein rotation of the impeller at least partially results from a movement of the air flowing across the impeller.

4. The ventilating apparatus according to claim 1, wherein the ventilating apparatus comprises at least one temperature control device.

5. A seat for a vehicle comprising at least one of the ventilating apparatus according to claim 1.

6. A vehicle comprising at least one assembly including at least one of the ventilating apparatus according to claim 1.

7. A ventilating apparatus comprising:
    i. an air conveying means;
    ii. an elongated first arm connected at one end to the air conveying means, and at an opposing end, the first arm includes a first intake opening;

iii. an elongated second arm connected at one end to the air conveying means, and at an opposing end, the second arm includes a second intake an outlet opening, and
iv. an elongated third arm connected at one end to the air conveying means, and at an opposing end, the third arm includes outlet opening,
v. a mixing device arranged within the third arm between the air conveying means and the outlet opening;
wherein the air conveying means blows air through the third arm and out of the outlet opening towards a neck of a user,
wherein the mixing device mixes and swirls the au blown through the third arm before the air is blown out of the outlet opening,
wherein the mixing device comprises a non-motorized impeller that is rotated exclusively by the air blown out of the outlet opening,
wherein the air conveying means sucks air through the first arm via the first intake opening from an area around the neck of the user,
wherein the air conveying means sucks air through the second arm via the second intake opening from the area around the neck of the user, and
wherein at least a partial recirculation of expelled air occurs between the outlet opening and both the first intake opening and the second intake opening.

8. The ventilating apparatus of claim 7, wherein the outlet opening is arranged between the first intake opening and the second intake opening.

9. The ventilating apparatus of claim 7, wherein the ventilating apparatus comprises one or more heating appliances for heating the air blown out of the outlet opening.

10. The ventilating apparatus of claim 7, wherein the first arm and the second arm each comprise a plurality of duct segments, and each of the duct segments comprise segments joints so that the duct segments are bendable relative to one another.

11. The ventilating apparatus of claim 7, wherein the first intake opening, the second intake opening, and the outlet opening are provided on an A-side of the seat.

12. The ventilating apparatus of claim 11, wherein the air conveying means, the first arm, the second arm, and the third arm are located within a back rest of the seat.

13. A seat for a vehicle comprising at least one of the ventilating apparatus according to claim 7.

14. A ventilating apparatus comprising:
i. an air conveying means;
ii. an elongated first arm connected at one end to the air conveying means, and at an opposing end, the first arm includes a first intake opening;
iii. an elongated second arm connected at one end to the air conveying means, and at an opposing end, the second arm includes a second intake opening;
iv. an elongated third arm connected at one end to the air conveying means, and at an opposing end, the third arm includes an outlet opening, and
v. a mixing device arranged within the third arm between the air conveying means and the outlet opening;
wherein the air conveying means blows air through the third arm and out of the outlet opening towards a neck of a user,
wherein the mixing device mixes and swirls the air blown through the third arm before the air is blown out of the outlet opening,
wherein the mixing device comprises a non-motorized impeller that is rotated exclusively by the air blown out of the outlet opening, and
wherein the air conveying means sucks air through the first arm and the second arm via the first intake opening and the second intake opening from the area around the neck of the user.

15. The ventilating apparatus of claim 14, wherein the ventilating apparatus comprises one or more heating appliances for heating the air blown out of the outlet opening.

16. The ventilating apparatus of claim 14, wherein the second arm and the first arm each comprise a plurality of duct segments, and each of the duct segments comprise segments joints so that the duct segments are bendable relative to one another.

17. The ventilating apparatus of claim 14, wherein the outlet opening is arranged between the first intake opening and the second intake opening.

* * * * *

UNITED STATES PATENT AND TRADEMARK OFFICE
CERTIFICATE OF CORRECTION

PATENT NO. : 9,346,384 B2
APPLICATION NO. : 14/574599
DATED : May 24, 2016
INVENTOR(S) : Jonathan Yu Zhang et al.

Page 1 of 1

It is certified that error appears in the above-identified patent and that said Letters Patent is hereby corrected as shown below:

In the Claims

Column 7, Claim 7, line 3, "second intake an outlet opening" should be "second intake opening".

Column 7, Claim 7, Line 12, "au" should be "air".

Signed and Sealed this
Nineteenth Day of July, 2016

Michelle K. Lee
*Director of the United States Patent and Trademark Office*